United States Patent
Lawler

(10) Patent No.: US 9,690,609 B2
(45) Date of Patent: Jun. 27, 2017

(54) PROVENANCE IN CLOUD COMPUTING SYSTEMS

(71) Applicant: CA, Inc., Islandia, NY (US)

(72) Inventor: Eamonn Lawler, Monmouth (GB)

(73) Assignee: CA, Inc., Islandia, NY (US)

( * ) Notice: Subject to any disclaimer, the term of this patent is extended or adjusted under 35 U.S.C. 154(b) by 85 days.

(21) Appl. No.: 14/331,455

(22) Filed: Jul. 15, 2014

(65) Prior Publication Data

US 2016/0019076 A1 Jan. 21, 2016

(51) Int. Cl.
G06F 11/34 (2006.01)
G06F 9/455 (2006.01)
G06F 9/46 (2006.01)

(52) U.S. Cl.
CPC .......... *G06F 9/45558* (2013.01); *G06F 9/466* (2013.01); *G06F 2009/45575* (2013.01)

(58) Field of Classification Search
CPC ............... G06F 7/78; G06F 8/00–8/78; G06F 9/44–9/455; G06F 11/36
See application file for complete search history.

(56) References Cited

U.S. PATENT DOCUMENTS

| | | | | |
|---|---|---|---|---|
| 8,601,583 B1* | 12/2013 | Chandrasekhar | ....... | G06F 21/54 726/24 |
| 2004/0128670 A1* | 7/2004 | Robinson | ................ | G06F 9/465 718/1 |
| 2007/0027742 A1* | 2/2007 | Emuchay | ................ | G06F 9/466 705/7.27 |
| 2008/0209078 A1* | 8/2008 | Bates | .................... | G06Q 10/00 710/10 |
| 2009/0328030 A1* | 12/2009 | Fries | ........................ | G06F 8/63 717/174 |
| 2010/0070463 A1* | 3/2010 | Zhao | ...................... | G06Q 10/06 707/608 |
| 2010/0223613 A1* | 9/2010 | Schneider | ........... | G06F 9/45558 718/1 |
| 2010/0250932 A1* | 9/2010 | Dill | ........................ | H04L 12/58 713/168 |

(Continued)

OTHER PUBLICATIONS

Wang et al., Efficient Recovery of Missing Events, 2016.*

(Continued)

*Primary Examiner* — H S Sough
*Assistant Examiner* — Zhan Chen
(74) *Attorney, Agent, or Firm* — Stevens & Showalter, LLP

(57) ABSTRACT

A method comprises pairing a virtual machine instance with a virtual agent that is registered with registry in an execution environment. In this regard, upon instantiating the virtual machine and the corresponding virtual agent, the virtual agent monitors for transaction(s), e.g., a specific invoked method, on that execution environment. The virtual agent is also configured for generating an event in response to detecting the transaction. The virtual agent provides a unique signature associated with the event, which identifies the origin of the virtual machine instance. Still further, the virtual agent is configured for forwarding the event to the registry for collating with other events so as to produce composite end-to-end logs of processes in a manner that enables provenance.

20 Claims, 5 Drawing Sheets

(56) References Cited

U.S. PATENT DOCUMENTS

| | | | | |
|---|---|---|---|---|
| 2011/0218920 A1* | 9/2011 | Agrawal | ............ | G06Q 30/0283 705/50 |
| 2012/0166625 A1* | 6/2012 | Suit | ........................ | G06F 9/06 709/224 |
| 2012/0191643 A1* | 7/2012 | Hom | ...................... | G06F 9/544 707/607 |
| 2012/0258712 A1* | 10/2012 | Rozinov | ............. | H04L 61/1535 455/435.1 |
| 2014/0129698 A1* | 5/2014 | Seago | ..................... | G06F 9/542 709/224 |
| 2015/0309502 A1* | 10/2015 | Breitgand | .......... | G05B 19/4097 700/98 |

OTHER PUBLICATIONS

Krishnan et al., Trail of Bytes Efficient Support for Forensic Analysis, 2010.*

Krishnan et al., Trail of Bytes New Techniques for Supporting Data Provenance and Limiting Privacy Breaches, 2012.*

Imran, Asif et al.; "Active-Threaded Algorithms for Provenance Cognition in the Cloud preserving Low Overhead and Fault Tolerance"; ISBN: 978-960-474-361-2; pp. 249-255; Institute of Information Technology, University of Dhaka, Bangladesh.

Muniswamy-Reddy, Kiran-Kumar et al.; "Making Cloud Storage Provenance Aware"; Feb. 23, 2009; pp. 1-42; Harvard School of Engineering and Applied Sciences; Cambridge, MA.

Imran, Muhammad et al.; "Provenance in the Cloud: Why and How?"; ISBN: 978-1-61208-216-5; Copyright (c) Iaria, 2012; pp. 106-112; Research Group Entertainment Computing; University of Vienna, Austria.

Bates, Adam et al.; "Towards Secure Provenance-Based Access Control in Cloud Environments"; Feb. 18-20, 2013; pp. 1-8; Department of Computer and Information Science; University of Oregon; Eugene, OR.

Chow, Sherman S.M. et al.; "Dynamic Secure Cloud Storage with Provenance"; 2011; pp. 442-464; Springer-Verlag Berlin Heidelberg; University of Waterloo; Waterloo, Canada.

Zhang, Olive Qing et al.; "How to Track Your Data: The Case for Cloud Computing Provenance"; Nov. 2011; pp. 1-10; Copyright 2012 Hewlett-Packard Development Company, L.P.; HP Laboratories.

Valafar, Masoud et al.; "Poster: Secure Provenance for Cloud Storage"; pp. 1-2; Department of Computer and Information Science; University of Oregon; Eugene, OR 97403.

Lu, Rongxing et al.; "Secure Provenance: The Essential of Bread and Butter of Data Forensics in Cloud Computing"; ASIACC'10 Apr. 13-16, 2010, Beijing, China; pp. 1-11; Department of Electrical and Computer Engineering; University of Waterloo; Waterloo, Canada.

Muniswamy-Reddy, Kiran-Kumar et al.; "Provenance as First Class Cloud Data"; pp. 1-6; Harvard School of Engineering and Applied Sciences; Cambridge, MA.

Abbadi, Imad M. et al.; "Challenges for Provenance in Cloud Computing"; pp. 1-6; Department of Computer Science, University of Oxford; Oxford, United Kingdom.

Muniswamy-Reddy, Kiran-Kumar et al.; "Provenance for the Cloud"; pp. 1-14; Harvard School of Engineering and Applied Sciences; Cambridge, MA.

* cited by examiner

PROVENANCE IN CLOUD COMPUTING SYSTEMS

BACKGROUND

The present disclosure relates in general to computer systems and in particular, to enabling provenance in cloud computing systems.

Cloud computing is a form of distributed network computing that is steadily gaining popularity as a method of providing Internet based software, platforms, and infrastructure services. Cloud systems utilize pooled resources, which are potentially shared by many cloud users. These pooled resources may reside on an underlying physical layer of an infrastructure, such as a physical server. However, these pooled resources may also reside as an overlay of a virtual layer. The virtual layer enables dynamic behavior of the cloud infrastructure in a manner that can be managed by automated management services. This dynamic behavior further enables some cloud computing benefits such as dynamic scalability.

BRIEF SUMMARY

According to aspects of the present disclosure herein, provenance of business processes in a cloud environment is preserved. Provenance is preserved by pairing a virtual machine instance in a cloud computing environment with a virtual agent. Here, the virtual agent is registered with a registry, such as a known, persistent registry. Moreover, provenance is preserved by detecting a transaction involving the virtual machine, where the transaction is associated with a business process. Further, provenance is preserved by generating an event in response to detecting the transaction, where the generated event includes provenance information associated with the virtual machine instance. Provenance information can be included by encoding into the event, a signature that uniquely identifies an origin of the virtual machine instance. Moreover, provenance is preserved by forwarding the event to the registry. In this regard, the forwarded event is collected with other events so as to produce a composite end-to-end log of the business process in a manner that enables provenance of the virtual machines that participate in the business process.

DETAILED DESCRIPTION

Figure 1:
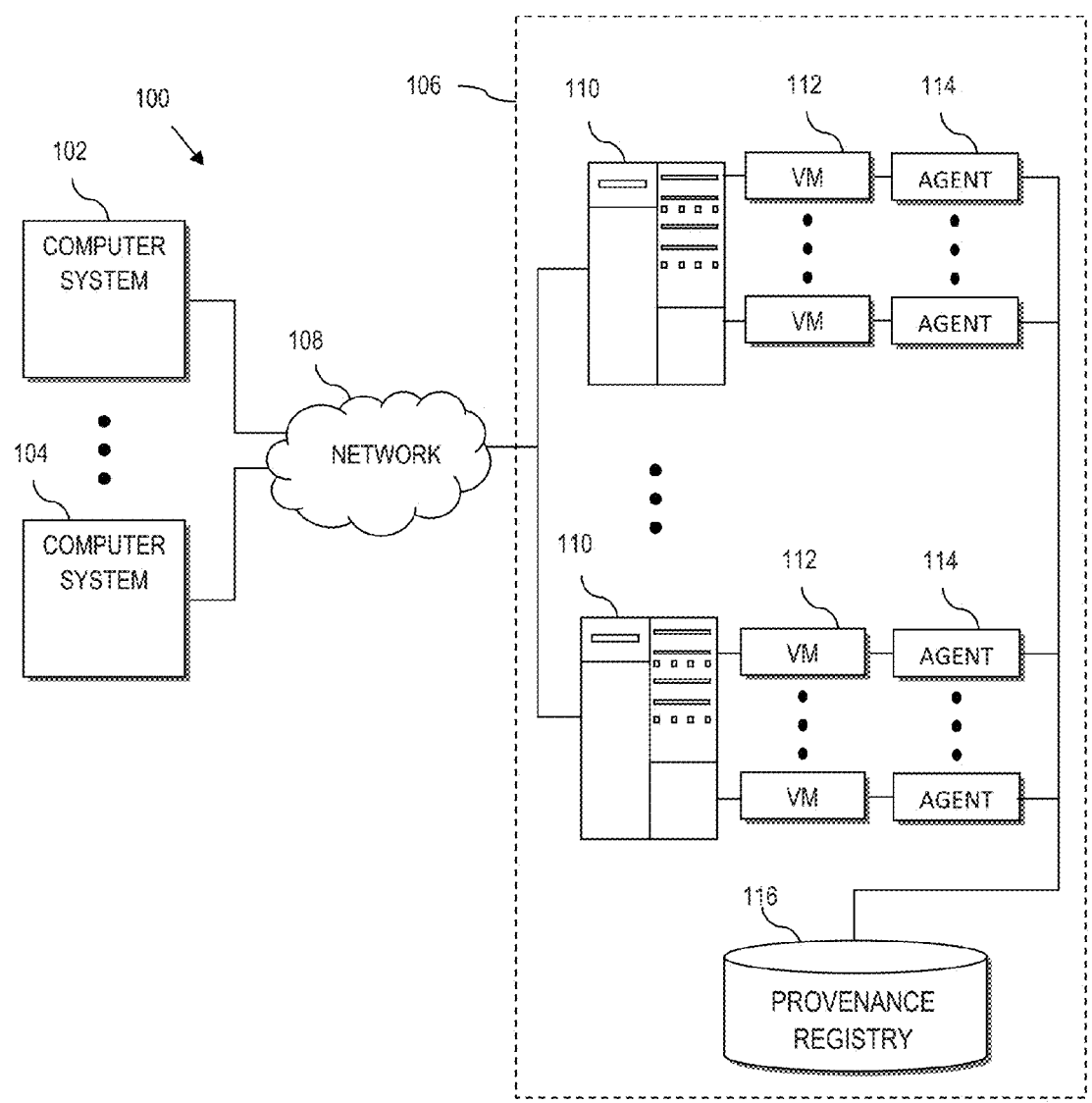
FIG. 1 is an simplified block diagram of a cloud computing environment in which provenance is captured, according to aspects of the present invention herein.

Aspects of the present disclosure provide solutions for preserving provenance in a cloud infrastructure.

As used herein, the term "provenance" means information that pertains to, relates to, or is otherwise associated with the origin of an event, message, artifact, object, or other software data. In certain implementations, provenance may also be utilized to provide information on the actions associated with the software data from the origin of that data onward.

The dynamic behavior of cloud infrastructures, and in particular, the dynamic nature of the virtual layer in cloud infrastructures, makes tasks such as provenance difficult. In this regard, the origin of artifacts and events in a cloud infrastructure is obfuscated by the dynamic provisioning, participation and decommissioning of virtual resources in the virtual layer.

However, according to aspects of the present disclosure herein, a cloud environment is provided in which virtual machine instances are each configured with a virtual agent that is registered with a known, persistent registry in an execution environment. By way of example, a template, e.g., wizard, definition file, etc., may be used to define virtual machines. Such a template is pre-configured with information defining a corresponding virtual agent as described more fully herein. Thus, upon instantiating the virtual machine (e.g., from the pre-configured template or other source), the associated virtual agent is also automatically instantiated. As noted above, upon instantiation, the virtual agent is registered or otherwise registers with the persistent registry.

After instantiation, the virtual agent monitors (i.e., listens, detects, etc.) for a transaction of the virtual machine, e.g., that is associated with a business process. For instance, the virtual agent can monitor for a specific invoked call. Example calls include a method call such as a Java method call, Enterprise Java Bean (EJB) call, web-service call, etc. As another example, the virtual agent may monitor for a return call. The virtual agent may also monitor for transactions such as Java Message Service (JMS) messaging transactions, SQL transactions, SOAP transactions, etc. The virtual agent further generates an event in response to detecting the transaction, and any such events are forwarded, e.g., by the virtual agent, to the known registry.

The event may include information such as the request and response payload, execution time, origin/identity of the virtual machine, the transaction period, a time stamp, a category, a call, SQL transaction, SOAP transaction, a Local IP address, a remote IP address, the execution time, an SQL state, or other relevant information necessary to assemble provenance information. Here, provenance information associated with the virtual machine instance is included in the event information. In an example implementation, the virtual agent encodes into the event, a unique signature that identifies the origin of the virtual machine instance. In this regard, it is possible to enable provenance to be derived at Applications Programming Interface (API) layers.

The registry stores the received events with other previously received events, from this virtual agent (and other virtual agents associated with other virtual machines within the cloud infrastructure) to produce composite end-to-end logs of processes in a manner that enables provenance.

System Overview:

Referring to figures, and specifically to FIG. 1, an environment 100 is shown by way of example, which is capable of producing composite end-to-end logs of processes in a manner that enables provenance. For simplicity of discussion, FIG. 1 illustrates two computer systems 102, 104 that are connected to a cloud computing service 106 through a network 108. In illustrative implementations, each of the computer systems 102, 104 may be implemented as a server computer, an appliance, personal computer, a laptop, a cell phone, a smart phone, a tablet computer, pervasive computing device, etc. While two computer systems 102, 104 are shown, any number of computer systems may be coupled to the cloud computing service 106 across the network 108.

The network 108 may include a wide-area network (WAN), local-area network (LAN), the Internet, a peer-to-peer network, wireless local-area network (WLAN), other wireless technology, or other approach that facilitates communication, etc.

The cloud computing service 106 may, in practice, be implemented as one or more physical hardware devices 110, each of which is capable of executing one or more virtual machines 112. As will be described in greater detail herein, each virtual machine 112 is paired with a virtual agent 114 such that, upon instantiation of the virtual machine instance, a corresponding virtual agent instance is also instantiated. Each virtual agent 114 monitors its associated virtual machine 112. Upon detection of an event such as a transaction associated virtual machine 112, the corresponding virtual agent 114 reports the event to a registry 116 such that provenance information pertaining to the virtual machine 112 is retrievable from the registry 116, e.g., as an end-to-end log. For instance, the virtual agent 114 can encode into the event, a unique signature that identifies the origin of the instance of the associated virtual machine 112, examples of which are set out in greater detail herein. In this manner, provenance information of transactions, e.g., transactions associated with a business process, invoked methods, return calls, or other activities of interest, can be logged in such a manner that provenance information of associated virtual machine 112 is preserved.

The virtual machines 112 may be any virtualizable abstraction. For instance, each virtual machine 112 typically emulates a physical computing environment. Thus, for instance, requests for hardware resources from virtual machines 112 may be managed by a virtualization layer, which translates the requests for hardware resources to an associated underlying physical hardware device 110. The physical hardware devices 110, e.g., physical servers, can be co-located or distributed. The virtualization layer can also be used to create many individual, isolated virtual machine environments. As such, each physical hardware device 110 can execute one or more virtual machines 112. Moreover, a virtual machine 112 may be distributed across multiple physical hardware devices 110.

In the normal course of operation of the cloud computing service 106, the dynamic provisioning, participation and decommissioning of virtual machine instances is an ongoing process. However, as described in greater detail herein, whenever a virtual machine 112 is instantiated, a corresponding virtual agent 114 is also instantiated. Because of the strong affinity between a virtual machine 112 and its associated virtual agent 114, it is possible to create virtual agents 114 that are tasked to capture provenance information about transactions such as the business processes that are touched by their associated virtual machine 112. Moreover, each virtual agent 114 has (or is otherwise capable of generating or obtaining) a unique signature that allows the collected provenance information to be logged in the registry 116 in a manner that allows the reconstruction of end-to-end histories, as will be described in greater detail below.

Over the course of operation, the registry 116 receives events from the virtual agents 114. In this regard, the registry 116 organizes the collected events so as to produce composite end-to-end logs of processes in a manner that enables provenance. In illustrative examples, the registry 116 is a persistent data source that is utilized by the cloud computing service 106 to store provenance information independently of the underlying data. That is, the registry 116 includes provenance data about the virtual machines 112. However, the virtual machines 112 themselves may be agnostic to the existence of the virtual agent 114 and/or the provenance data stored in the registry 116. Accordingly, the virtual machines 112 themselves do not need to be re-architected to collect and store their own provenance data because this task is allocated to the virtual agents.

As illustrated, the registry 116 exists within the cloud computing service 116. This configuration may provide convenience for ensuring that the provenance data is complete and secure. In alternative configurations, the registry 116 can exist outside the cloud computing service 106.

Although described in the general context of a cloud computing service 106, in practice, aspects of the present disclosure herein can be implemented on any system where resources such as virtual machines 112 are created and decommissioned, and where provenance is to be established.

Figure 2:
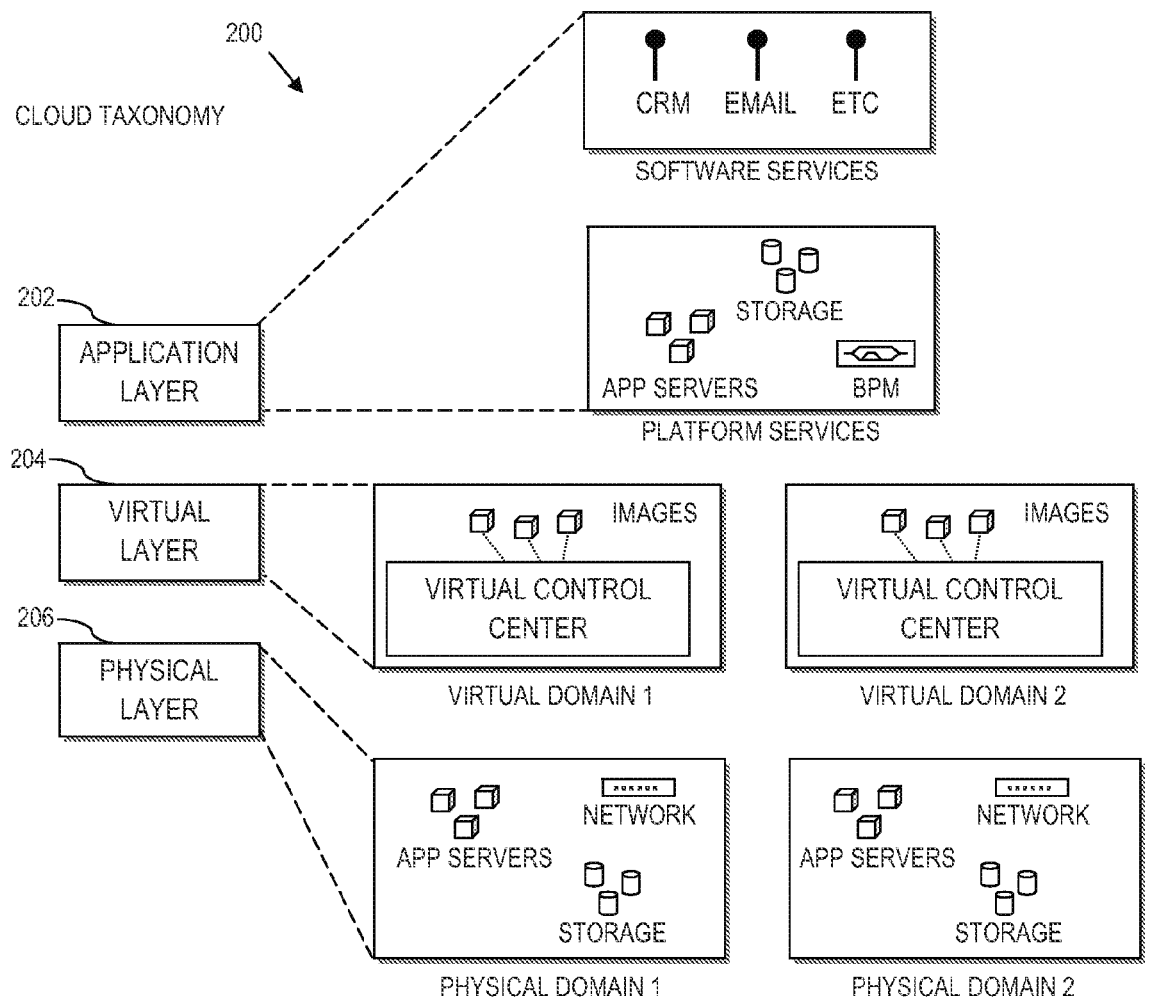
FIG. 2 is a schematic diagram of an example cloud taxonomy.

Cloud Taxonomy:

With reference to FIG. 2, a cloud taxonomy 200 is illustrated. The cloud taxonomy 200 may be implemented, for instance, with regard to the cloud computing service 106 of FIG. 1. In other implementations, the cloud taxonomy 200 may be implemented on other hardware systems.

The illustrated taxonomy 200 includes three layers, including an application layer 202, a virtual layer 204, and a physical layer 206.

The application layer 202 is a layer that supports virtualized software services and virtualized platform services. For instance, as illustrated, the non-limiting, but illustrative application layer 200 hosts software applications that are running in the environment, examples of which may include Customer Relationship Management (CRM) software, email, and other applications. The application layer 202 may also (or alternatively) host platform services such as application servers, storage, business product management (BPM) software, etc. The application layer 202 may be a virtualization layer that virtualizes products, e.g., as may be utilized in a software as a service (SAAS), or in other applications. The above are merely illustrative and not limiting to the scope of a given application layer.

The virtual layer 204 supports one or more virtual environments, identified as Virtual Domain 1 and Virtual Domain 2. Each virtual environment includes a virtual control center for managing the resources that are virtualized within the domain. In practice, there can be any number of virtual domains. The virtual layer 204 may be utilized for platform as a service (PAAS) and SAAS services, as well as Infrastructure as a service (IAAS) services.

The physical layer 206 is the layer of physical hardware that executes the application layer 202 and virtual domain(s) in the virtual layer 204. The physical layer 206 supports one or more physical components, identified as Physical Domain 1 and Physical Domain 2. Each physical domain includes one or more physical application servers, storage devices, network hardware devices, middleware hardware devices, etc. For instance, a physical domain may comprise a physical hardware device 110 as illustrated in FIG. 1. In practice, there can be any number of physical domains.

General Approach:

Cloud computing relies on sharing of resources to achieve coherence and economies of scale. According to aspects of the present disclosure herein, agent technology is utilized to facilitate logging of information sufficient to support provenance in computing environments such as cloud computing environments.

Figure 3:
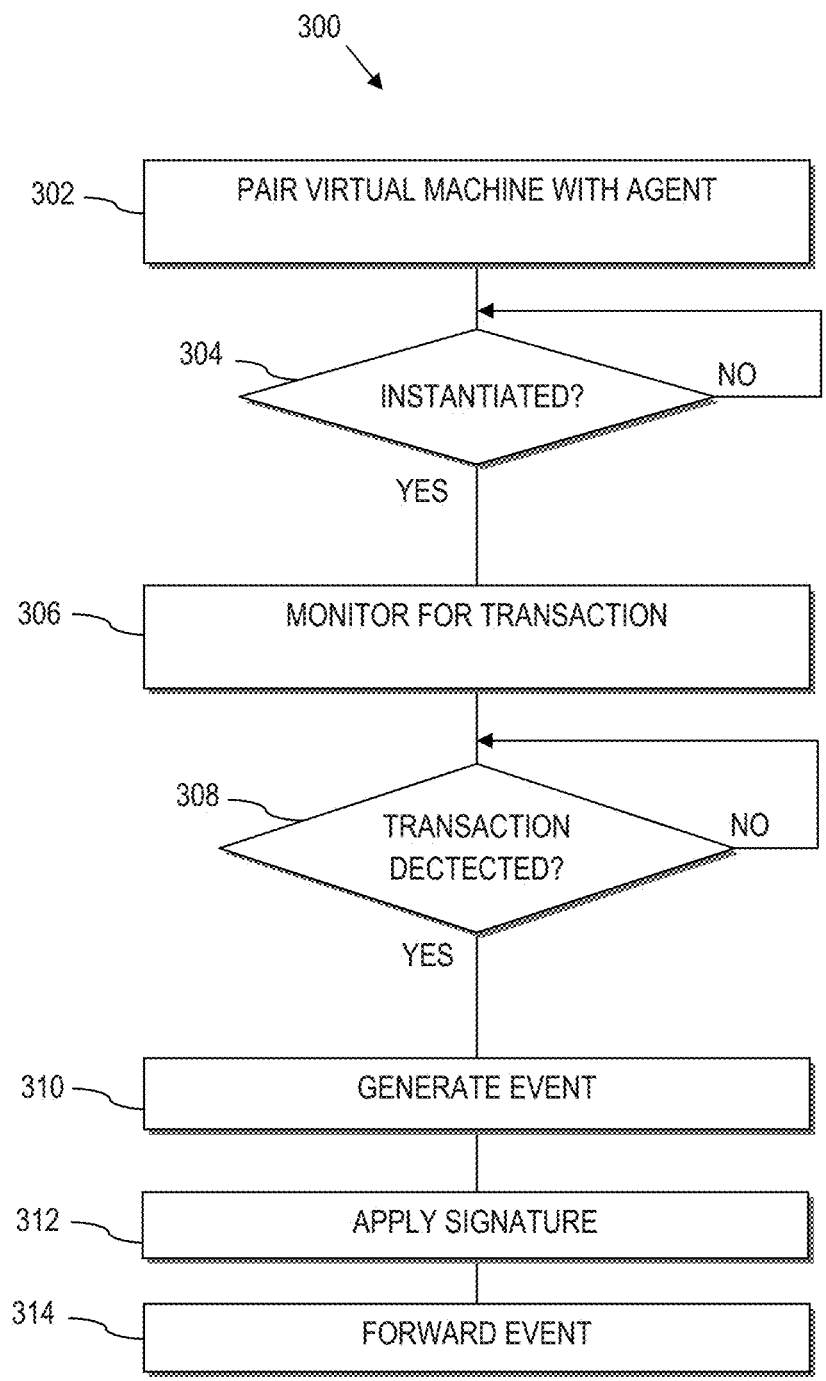
FIG. 3 is a flow chart illustrating a method of preserving provenance in a cloud infrastructure.

Referring to FIG. 3, an algorithm illustrates a machine-executable method 300, which may be executed on a computer system for preserving provenance in a cloud infrastructure. The method may be implemented for instance, within the system of FIG. 1 or FIG. 2. In this regard, the method 300 may be implemented as computer-readable hardware that stores machine-executable program code, where the program code instructs a processor to implement the described method. The method 300 may also be executed by a processor coupled to a memory (e.g., one or more of the computer system 102, 104; or the cloud computing service 106; of FIG. 1) wherein the processor is programmed to perform the described method.

The method 300 comprises pairing, at 302, a virtual machine with a virtual agent. In illustrative implementations, the virtual machine is pre-configured with a virtual agent that is registered with a registry in an execution environment, such as the cloud computing environment described with reference to FIGS. 1 and 2. As an example, with reference back to FIG. 1, when virtual machine 112 is instantiated, a corresponding virtual agent 114 is also automatically instantiated. The instantiated virtual agent 114 is registered with the persistent registry 116 within the execution environment of the cloud computing service 106.

In this regard, the virtual machine can be configured with a corresponding virtual agent by modifying a virtual machine template (e.g., wizard, profile or other definition of a virtual machine) prior to instantiation, to include the virtual agent that is described more fully herein. Moreover, each agent may comprise the same or different configuration. For instance, where it is desirable to preserve provenance in an application involving business processes, each agent may be specifically configured to monitor for a specific transaction associated with the business process of interest. As such, different virtual agents working together may each monitor for different transactions or other activities associated with their corresponding virtual machine. However, each virtual agent is registered with the same repository for depositing generated events. In other applications, an agent may be configured to monitor for its corresponding virtual machine instance invoking a specific calls, possibly regardless of the specific business process implemented. Other implementations may be utilized, depending for instance, upon the host environment and/or transactions, event, messages, artifacts, objects, other software data, etc., to be monitored for preserving provenance.

In this regard, the method 300 is particularly suited for applications involving cloud services. One characteristic of cloud computing is resource polling. In an illustrative example, the provider's computing resources are polled to serve multiple consumers using a multi-tenant model, with different physical and virtual resources dynamically assigned and reassigned according to consumer demand. In this application, there is a sense of location independence in that the customer generally has no control or knowledge over the exact location of the provided resources. Moreover, rapid elasticity capabilities of the cloud service enable resources to be elastically provisioned and released (in some cases automatically) to scale rapidly outward and inward commensurate with demand. To the consumer, the capabilities available for provisioning often appear to be unlimited and can be appropriated in any quantity at any time.

Such dynamic provisioning, participation and decommissioning of virtual resources in the virtual layer makes provenance difficult. However, according to aspects of the present disclosure, each time a virtual resource is dynamically assigned, a virtual machine instance is instantiated. Moreover, that virtual machine instance launches or is otherwise associated with a unique virtual agent that logs data that is utilized for purposes of provenance. This virtual agent is instantiated and decommissioned along with its associated virtual machine. As such, provenance records persist independently of the virtual machines and their corresponding virtual agents.

A decision is made at 304 as to whether a virtual machine has been instantiated. If a virtual machine is instantiated, the virtual agent associated with the virtual machine is also automatically instantiated. By way of example, a virtual machine instance may comprise a Java Virtual Machine (JVM). In this illustrative implementation, a virtual agent is pre-configured within the JVM such that once instantiated, the virtual agent is registered with a registry in an execution environment. As noted herein, the registry is preferably a known registry that is persistent, and is thus able to collect events despite the repeated instantiation and decommissioning of virtual machines and their corresponding virtual agents.

In an illustrative example, the virtual agent is configured to monitor e.g., detect, listen, etc., at 306, for a specific transaction of the virtual machine. For instance, a virtual agent may monitor its corresponding virtual machine for transactions associated with a business process, e.g., for method calls from an application server, monitor for a return response, or both. If no transaction is detected at 308, the virtual agent continues to monitor the associated virtual machine instance.

In response to detecting a transaction at 308, an event is generated at 310, by the virtual agent, where the generated event includes provenance information associated with the virtual machine instance.

The method still further comprises encoding into the event, a unique signature that identifies the origin of the virtual machine instance. For instance, encoding into the event, a unique signature that identifies the origin of the virtual machine instance may be implemented by assigning a unique identification (ID) to the virtual agent. This ID is then used to create a signature based upon a 1-way hash. The 1-way hash may be created by taking several inputs, such as the unique ID (one is allocated to each of the virtual agents) and variable, e.g., a measure of time such as a timestamp, in order to generate the signature. For instance, the timestamp may comprise the current time that the event is created (or other reasonable time determination). From this signature, it is possible to retrospectively verify that the signature was generated by that unique ID, at that time. (Any other combination of inputs will generate a different signature). Thus, as illustrated, a signature is applied to the event at 312.

The method still further comprises forwarding the event to the registry for collection with other events so as to produce a composite end-to-end log of the business process in a manner that enables provenance of the virtual machines that participate in the business process. For instance, the event is forwarded at 314 to the registry, e.g., by the virtual agent. At the registry, the event is collected, e.g., collated with other events so as to produce composite end-to-end logs of processes in a manner that enables provenance of the virtual machines that participate in the business process, an example of which is set out with reference to FIG. 4.

The method 300 may thus be implemented for receiving, by the registry, the forwarded event, and collecting the received event with other events related to the same business process so as to produce a composite end-to-end log of the business process in a manner that enables provenance. The method may also comprise generating a dashboard view that arranges the events as connected icons that illustrate the end-to-end flow of the business process. In this regard, each displayed icon represents an atomic event carried out in the business process. An example of a dashboard is described below with reference to FIG. 4.

Working Example:

Aspects of the present disclosure are particularly suited for platform as a service (PAAS) and software as a service (SAAS) applications. Collecting and combining data from resources in PAAS and SAAS applications is not easy or practical considering the potential scale of such cloud systems.

In certain implementations, the concepts herein may be extendable to Infrastructure as a service (IAAS) as well. However, in an IAAS environment, additional virtual agents may be required at the physical layer to ensure that the system can provision a raw infrastructure to cloud users.

In an implementation presented by way of example, Java agent technology is utilized. A Java agent is a small software component within corresponding virtual machine code that provides instrumentation capabilities to the associated virtual machine. In general, once the virtual machine and the Java agent are instantiated, the Java agent performs in an autonomous, persistent, manner, until decommissioned. More precisely, the Java agent is configured to monitor for corresponding transactions of its corresponding virtual machine instance. Upon detecting a transaction, the virtual agent generates an event message, attaches a signature that denotes the origin of the virtual machine instance, and forwards the event to the registry in such a way that provenance information is collected at the registry.

For instance, in an illustrative implementation, Java Virtual Machines are pre-configured with Java Pathfinder agents. The Pathfinder agents are pre-configured to communicate with a designated Pathfinder registry.

In this regard, business processes running on an instantiated virtual machine within the cloud infrastructure, are automatically monitored by one or more virtual agents, which log relevant provenance information irrespective of the particular virtual resource that the business process happens to employ within the cloud. Notably, the Pathfinder agents log events to the Pathfinder registry in a manner that allows provenance, even after a virtual machine instance and its corresponding Pathfinder agent have been decommissioned.

In an illustrative implementation, CA LISA Pathfinder by CA Technologies of Islandia, N.Y., is modified to use Java Virtual Machine-based agents to observe Java virtual machine transactions, e.g., method calls, return responses, or both. Recorded events log the transactions with associated provenance information, e.g., in the form of a unique agent signature. More particularly, virtual agents are configured to filter calls of interest. Registered transactions are collected in a central persistent registry, such as a Pathfinder registry. In an illustrative example, for every end-user interaction with the cloud infrastructure, a virtual agent creates an event record that is forwarded to the registry. As another example, listening for a specific transaction may comprise listening for method calls from an application server. As yet another example, monitoring for a specific transaction may comprise detecting a business process activity in a cloud computing environment, detecting a response to a method call, etc. In the above-examples, the underlying Pathfinder capabilities enable the collection, forwarding and aggregation of events that take place in a distributed environment.

In response to detecting a transaction, e.g., method call, return response, detected business process activity, etc., the virtual agent generates an event that includes provenance information about the virtual machine instance. Notably, each virtual agent is associated with a signature that discloses the origin of that virtual agent. The signature may also encode the time of the event, e.g., via an encoded timestamp. Details of this signature are then forwarded with each event to the registry. According to aspects of the present invention, each instantiated virtual agent has a unique signature in the form of a 1-way hash. When each virtual agent communicates back to the registry, the virtual agent sends the signature, thus identifying the virtual agent (correspondingly identifying its virtual machine) and providing a means to correlate event records received over time. As noted in greater detail above, the signature not only uniquely identifies the virtual agent, but also enables retrospective verification of the authenticity of the event record. This can be seen because the signature is created with a variable such as current time and a constant such as the unique ID of the virtual agent. Given a current time and a unique ID, the signature is unique each time it's computed, and the signature is verifiable.

As yet a further example, in a PAAS cloud infrastructure, each instantiated virtual agent is configured to monitor for specific transaction(s), e.g., invoked methods, calls, messaging transactions, SQL transactions, SOAP transactions etc., on their corresponding virtual machine. An illustrative example is to monitor for method calls from an application server. The designated registry receives the events generated by the various virtual agents. The collected events are collated to provide composite, end-to-end logs of processes where the logs can be inspected to recover provenance information about the virtual machine instances involved in the processes.

Unlike previous provenance systems, the approaches set out herein provide a solution that enables provenance to be derived at an applications programming interface (API) layer, thus facilitating realizable end-to-end log histories. This is significantly different from, and provides different results from, conventional concepts of provenance, such as collating log files from disparate systems, deriving common events across these log files, and thereby assembling some estimation of provenance, or using a remote third party process enforcement point, which must be called by any parties prior to making a data read/write request. Such previous approaches are incapable of achieving end-to-end provenance for business processes running in cloud.

A business process will typically run in a composite infrastructure, orchestrated amongst many participating components. The approaches described more fully herein offer a means of achieving provenance for such business processes because each virtual agent is built for its corresponding virtual machine. Because of the inherent strong cohesion between a virtual machine and its virtual agent, the virtual agent can monitor for transactions, e.g., select methods, return responses, etc., which are predetermined and that are built into the virtual agent to be relevant to the collection of end-to-end provenance for its virtual machine. Moreover, the unique signature of each virtual agent, e.g., comprised of a 1-way hash that takes several inputs, such as a unique id and a measure of time such as the current time (or other reasonable time determination), provides a clear manner to authenticate event records sent to the repository. The completion of a composite business process may have been achieved through a number of smaller atomic transactions, which may involve the likes of Java method calls, Enterprise Java Bean (EJB) calls, web-service calls, Java Message Service (JMS) messaging transactions, SQL transactions, SOAP transactions etc., all of which may be captured and audited for provenance purposes because the virtual agent associated with its virtual machine understands how to detect such business processes.

Notably, aspects disclosed herein further facilitate an implementation where one or more virtual agents monitor for low level calls, e.g., at the data level, at the atomic level, etc.

Example Provenance Dashboard

Figure 4:
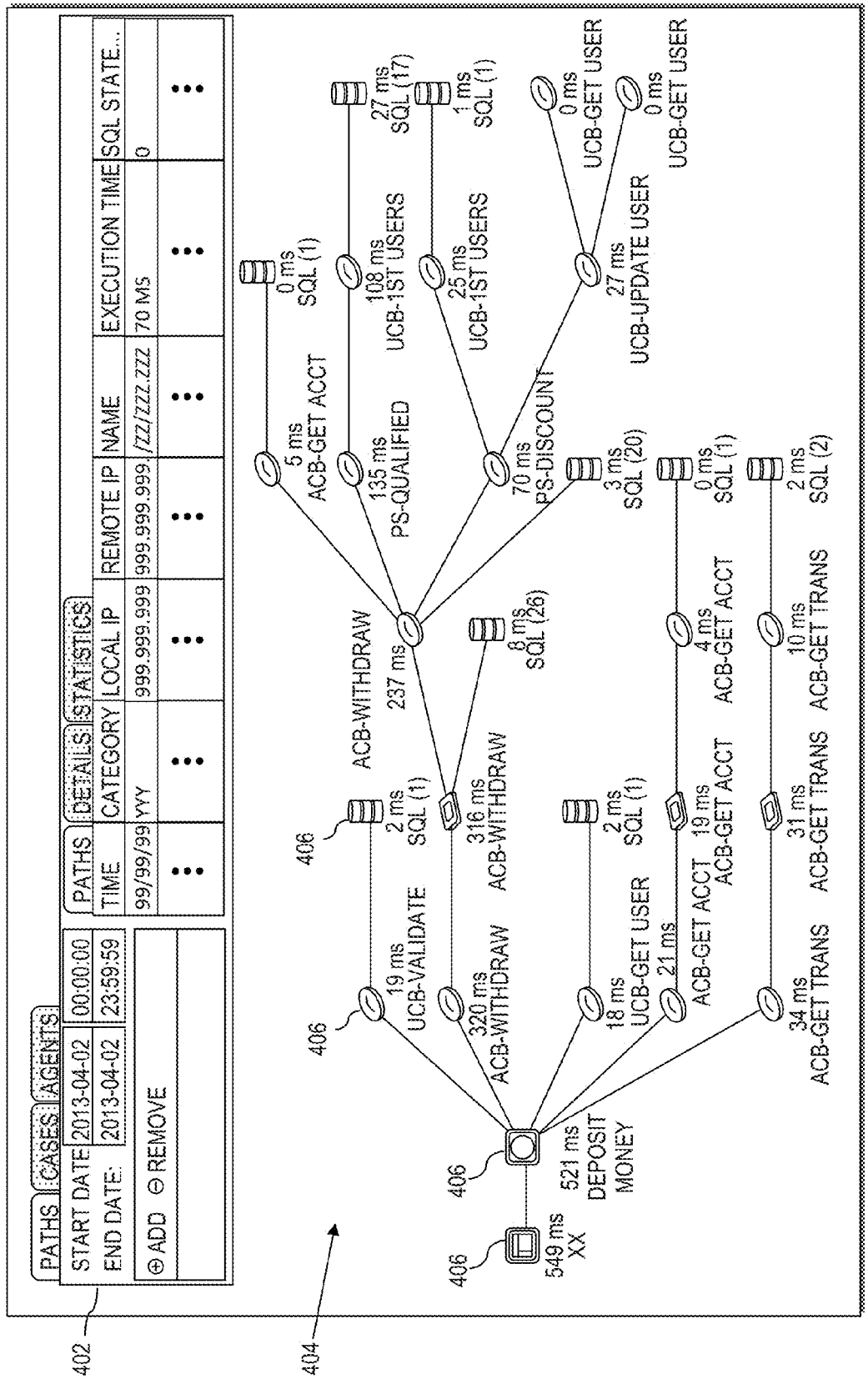
FIG. 4 is an illustrative interface for the introspective analysis of events collected by a registry, as they occurred in distinct virtual machines throughout a distributed infrastructure, in the illustrative context of a composite business process, according to aspects of the present disclosure.

Referring to FIG. 4, a screenshot illustrates an introspective dashboard view of example event data collected by a registry that receives provenance information as described more fully herein. For instance, a business process may have been executed by distributed virtual machines in a cloud computing service 106, each associated with a corresponding virtual agent as described, for instance, with reference to FIGS. 1-3. In the execution of the business process, each virtual agent monitors for one or more specific transactions, e.g., methods, return responses, messaging transactions, etc., associated with the business process. Upon detecting a transaction associated with the business process, the virtual agent of the associated virtual machine creates a provenance record, signs the record with a signature that uniquely identifies an origin of the virtual machine instance, e.g., a 1-way hash, and sends the signed information to the repository. In this way, the virtual agent filters actions, e.g., calls made by its associated virtual machine, to only send information to the repository that affects provenance of the business process.

The screenshot effectively illustrates how/what/where the underlying transactions were executed. That is, the provenance information collected herein enables the determination of a location, via the signature associated with the collected event information. Moreover, the collected information allows the construction of "what happened", "who was involved" and "which instances were involved". That is, "what part of the cloud touched the business process?"

More particularly, the screenshot illustrates an introspective analysis of events, as they occurred in distinct virtual machines throughout a distributed infrastructure in the context of a composite business process; i.e., one that is an aggregate result of many computations on distributed distinct virtual machines. The illustrative dashboard provides an end to end trace of a business process, as it occurred. The illustrative dashboard also provides the origin of individual computations that contributed to the business process. The dashboard thus illustrates that a composite business process has been executed.

In the example dashboard, the user may enter a start date and end date at 402. Over the user-selected time period, a work area 404 is utilized to display the underlying atomic transactions 406 that occurred to fulfill the composite business process. For each atomic transaction 406, the dashboard provides details such as request and response payload, execution time, origin/identity of the virtual machine and the transaction period. Moreover, the provenance information described in greater detail herein can be accessed to identify where each atomic transaction occurred (i.e. which virtual machine), thus establishing provenance for this composite business process. Thus, the dashboard analyzes the provenance records consumed by the registry during the execution of the business process and pieces together the atomic data into a graph that lays out the provenance of the entire business process from end-to-end.

In this illustrative example, information collected by the registry may include the identity of the virtual machine, which may be encoded in the signature as described more fully herein. The information may also include a time stamp. The information can also include a category, e.g., a web/http communication (illustrated as a square transaction—see examples to the left such as the box labeled 549 ms XX, the box labeled 521 ms DEPOSIT MONEY, etc.), method call (see the Java Beans—e.g., 19 ms UCB-VALIDATE, etc.) SQL transactions (see the stack of disks—e.g., 2 ms SQL(1), SOAP transactions (e.g., see the SOAP bars—e.g., 316 ms ACB-WITHDRAW, etc.).

Still further, provenance records may include a Local IP address, a remote IP address, a name, the execution time, an SQL state, or other relevant information necessary to assemble provenance information.

For instance, clicking on an icon of a Java bean can expose a record of the Java method call, response time, identification of where the call was made, etc. A user can click on the SQL icon to see the underlying SQL query, etc. In this manner, the events forwarded by the virtual agents to the registry, identify what parts of a cloud touch a given process. Moreover, the dashboard can identify the signature associated with the particular event, and thus retrospectively verify that the signature was generated by the unique identification of the virtual agent and hence, the paired virtual machine. Moreover, the dashboard can retrospectively verify that the timestamp encoded into the signature matches a time included in the event.

Example Use:

As an illustrative but non-limiting example, in a financial institution, assume that a trader receives instruction from a client to execute a trade on a given asset at a given price. The trader begins a process of fulfilling this instruction, which involves interactions with a number of systems/people, both internal and external. For example, the trader may perform actions such as to query one or more markets to ascertain current prices for this asset; consult the client's account to determine whether the client can cover the trade; submit a trade request to the market; receive one or more offers from the market; check the status of a third party who has offered; execute the trade with the third party, etc.

For point of illustration, we assume that this process is enabled by a trade management system (the trader's employer has instantiated this) and that this system used cloud computing in order to meet the dynamic demand curve for computing resources.

At a later date, under suspicion of foul-play, this trade is questioned by authorities who wish to ascertain whether the trader used insider knowledge to corrupt the system. It is suspected that the trader implanted his own virtual machine in order to control the trade process.

However, using the provenance approaches herein, investigators are able to retrospectively view all trade processes executed by the trader. For each one, they may drill down to a level of detail showing a cookie trail of interactions for the trade process. They may drill down further from this level to view the individual transactions that formed the work of this process. For each transaction they view standard details, such as the request message, the response message, the time taken for a response and the destination IP and port of the end point. They also view a 'signature' that denotes the origin of the virtual machine that conducted this transaction.

Using this provenance information (the cookie trail view of the process, and the signatures for each of the virtual machines involved), investigators resolve whether that the process has been infiltrated.

Observations:

Systems and methods herein enable end-to-end logs of processes in a manner that implements logging and enables provenance. Provenance in turn, can be leveraged to provide a trusted cloud infrastructure. Moreover, provenance can be used to monitor, track, isolate or otherwise prevent insider threats. Still further, logging, especially with provenance, facilitates incident management. Yet further, logging, especially with provenance, facilitates scientific studies. Other applications exist and the above is meant to be illustrative.

Figure 5:
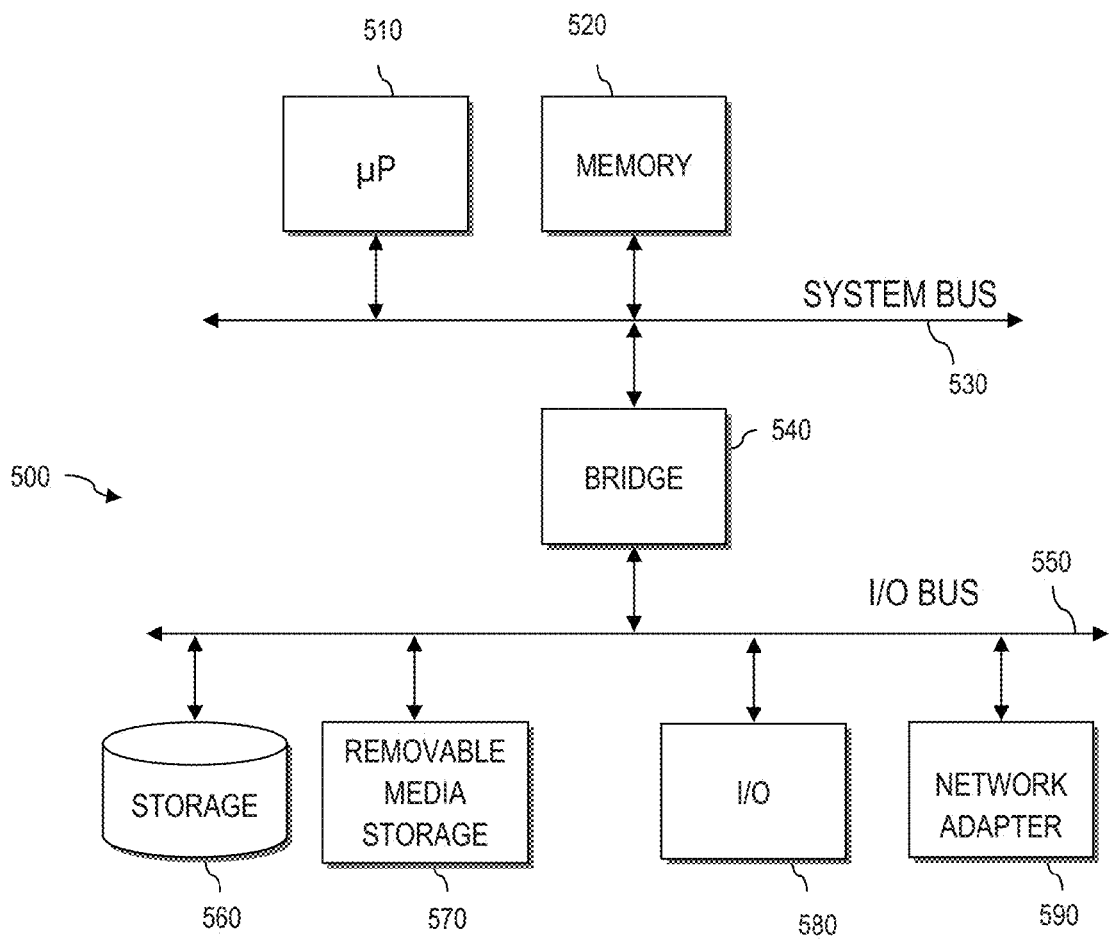
FIG. 5 is a schematic of a computer system comprising computer readable program code stored in computer readable hardware for executing any aspects described herein, according to various aspects of the present disclosure.

Miscellaneous:

Referring to FIG. 5, a schematic of a computer system (e.g., optionally one or more of the computer systems 102, 104, server 106 of FIG. 1) having computer readable program code for executing aspects described herein with regard to the preceding FIGURES. The computer system 500 includes one or more microprocessors 510 that are connected to memory 520 via a system bus 530. A bridge 540 connects the system bus 530 to an I/O Bus 550 that links peripheral devices to the microprocessor(s) 510. Peripherals may include storage 560, such as a hard drive, removable media storage 570, e.g., floppy, flash, CD and/or DVD drive, I/O device(s) 580 such as a keyboard, mouse, etc. and a network adapter 590. The memory 520, storage 560, removable media insertable into the removable media storage 570 or combinations thereof, can be used to implement the methods, configurations, interfaces and other aspects set out and described herein.

Thus, the computer system may be used to implement a machine-executable method for extending the reporting range of log activity, according to one or more of the methods set out herein.

In this regard, the memory 520, storage 560, removable media insertable into the removable media storage 570 or combinations thereof, can implement computer-readable hardware that stores machine-executable program code for extending the reporting range of log activity, wherein the program instructs a processor (e.g., microprocessor 510) to perform one or more of the methods set out herein.

Still further, the computer system may be implemented as an apparatus for extending the reporting range of log activity in a computer system, which may comprise a processor (e.g., microprocessor 510) coupled to a memory (e.g., memory 520, storage 560, removable media insertable into the removable media storage 570 or combinations thereof), wherein the processor is programmed to perform extending the reporting range of log activity by executing program code to perform one or more of the methods set out herein.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
   instantiating, in a cloud computing environment that supports dynamic provisioning and decommissioning of virtual machine instances, a virtual machine, whereupon a corresponding virtual agent is also automatically instantiated, wherein the virtual agent is independent from the virtual machine;
   pairing the virtual machine with the corresponding virtual agent, whereupon the virtual agent monitors for a transaction performed by the paired virtual machine;
   registering the virtual agent with a persistent registry that stores provenance information independently of underlying virtual machine transaction data; and
   performing by the virtual agent:
      detecting an occurrence of the transaction performed by the paired virtual machine, where the occurrence of the transaction is in response to the virtual machine participating in a process carried out in the cloud computing environment;
      generating an event in response to detecting the occurrence of the transaction, where the generated event includes provenance information associated with the virtual machine by encoding into the event, a signature that uniquely identifies an origin of the virtual machine; and
      forwarding the event to the registry;
   wherein:
   the forwarded event is collected with other events so as to produce a composite end-to-end log of the process in a manner that enables provenance of the virtual machine as participating in the process; and
   the provenance information includes information associated with the virtual machine associated with the provenance information to provide origin information about the transaction data from the virtual machine.

2. The method of claim 1, wherein:
   pairing the virtual machine with the corresponding virtual agent comprises:
      pre-configuring a virtual machine template such that when executed, the virtual machine template automatically instantiates both the virtual machine and the virtual agent.

3. The method of claim 1, wherein:
   encoding into the event, a signature that uniquely identifies the origin of the virtual machine instance comprises:
      computing the signature based upon a 1-way hash.

4. The method of claim 3, wherein:
   computing the signature based upon a 1-way hash comprises computing a 1-way hash of a unique identification assigned to the virtual agent, and a timestamp.

5. The method of claim 1, wherein:
   detecting an occurrence of the transaction performed by the paired virtual machine comprises:
      detecting at least one of a call, and a return call.

6. The method of claim 1, wherein:
   detecting an occurrence of the transaction performed by the paired virtual machine comprises:
      detecting a transaction derived at an applications programming interface (API) layer.

7. The method of claim 1, wherein:
detecting an occurrence of the transaction performed by the paired virtual machine comprises:
detecting a transaction as an atomic event.

8. The method of claim 1 further comprising:
generating a dashboard view by identifying select events collected into the registry that are associated with the process, wherein events are generated by different virtual agents working together to monitor different activities of the process associated with their corresponding virtual machines; and
arranging the select events as connected icons that illustrate the end-to-end flow of the process throughout a distributed infrastructure in the context of a composite process.

9. The method of claim 8, wherein:
encoding into the event, a signature that uniquely identifies the origin of the virtual machine instance comprises:
computing the signature based upon a 1-way hash of a unique identification assigned to the virtual agent, and a timestamp;
further comprising:
identifying a particular event in the dashboard view;
identifying the signature associated with the particular event; and
retrospectively verifying that the signature was generated by the unique identification at the time associated with the timestamp.

10. The method of claim 8, wherein:
generating a dashboard view by identifying select events collected into the registry that are associated with the process comprise:
representing each displayed event as an atomic transaction that occurred to fulfill the process; and
identifying on which virtual machine each atomic transaction occurred.

11. Computer-readable hardware that stores machine-executable program code for providing provenance of processes in a cloud environment, wherein the program code instructs a processor to:
instantiate, in a cloud computing environment that supports dynamic provisioning and decommissioning of virtual machine instances, a virtual machine, whereupon a corresponding virtual agent is also automatically instantiated, wherein the virtual agent is independent from the virtual machine;
pair the virtual machine with the corresponding virtual agent, whereupon the virtual agent monitors for a transaction performed by the paired virtual machine;
register the virtual agent with a persistent registry that stores provenance information independently of underlying virtual machine transaction data;
perform by the virtual agent:
detect an occurrence of the transaction performed by the paired virtual machine, where the occurrence of the transaction is in response to the virtual machine participating in a process carried out in the cloud computing environment;
generate an event in response to detecting the occurrence of the transaction, where the generated event includes provenance information associated with the virtual machine by encoding into the event, a signature that uniquely identifies an origin of the virtual machine; and
forward the event to the registry;
wherein:
the forwarded event is collected with other events so as to produce a composite end-to-end log of the process in a manner that enables provenance of the virtual machine as participating in the process; and
the provenance information includes information associated with the virtual machine associated with the provenance information to provide origin information about the transaction data from the virtual machine.

12. The computer-readable hardware of claim 11, wherein the program code to:
pair the virtual machine with the virtual agent comprises program code to:
pre-configure a virtual machine template such that when executed, the virtual machine template automatically instantiates both the virtual machine and the virtual agent.

13. The computer-readable hardware of claim 11, wherein the program code to:
encode into the event, a signature that uniquely identifies the origin of the virtual machine instance comprises program code to:
compute the signature based upon a 1-way hash.

14. The computer-readable hardware of claim 13, wherein the program code to:
compute the signature based upon a 1-way hash comprises program code to:
computing a 1-way hash of a unique identification assigned to the virtual agent, and a timestamp.

15. The computer-readable hardware of claim 11, wherein the program code to:
detect an occurrence of the transaction performed by the paired virtual machine, comprises program code to:
detect at least one of a call, and a return call.

16. The computer-readable hardware of claim 11, wherein the program code to:
detect an occurrence of the transaction performed by the paired virtual machine, comprises program code to:
detect a transaction derived at an applications programming interface (API) layer.

17. The computer-readable hardware of claim 11, wherein the program code to:
detect an occurrence of the transaction performed by the paired virtual machine, comprises program code to:
detect a transaction as an atomic event.

18. The computer-readable hardware of claim 11 further comprising program code to:
generate a dashboard view by identifying select events collected into the registry that are associated with the process, wherein events are generated by different virtual agents working together to monitor different activities of the process associated with their corresponding virtual machines; and
arranges the select events as connected icons that illustrate the end-to-end flow of the process throughout a distributed infrastructure in the context of a composite process.

19. The computer-readable hardware of claim 18, wherein the program code to:
encode into the event, a signature that uniquely identifies the origin of the virtual machine instance comprises program code to:

compute the signature based upon a 1-way hash of a unique identification
assigned to the virtual agent, and a timestamp;
further comprising program code to:
identify a particular event in the dashboard view;
identify the signature associated with the particular event; and
verify retrospectively, that the signature was generated by the unique identification at the time associated with the timestamp.

20. The computer-readable hardware of claim 18, wherein the program code to:
generate a dashboard view that identifies select events collected into the registry that are associated with the process comprises program code to:
represent each displayed event as an atomic transaction that occurred to fulfill the process; and
identify on which virtual machine each atomic transaction occurred.

* * * * *